US011324022B1

(12) United States Patent
Rai et al.

(10) Patent No.: US 11,324,022 B1
(45) Date of Patent: May 3, 2022

(54) METHOD AND SYSTEM FOR SELECTING A CARRIER ON WHICH TO SCHEDULE COMMUNICATIONS OF A TYPE OF BEARER TRAFFIC

(71) Applicant: Sprint Spectrum L.P., Overland Park, KS (US)

(72) Inventors: Deveshkumar N. Rai, Overland Park, KS (US); Naresh Madineni, Overland Park, KS (US); Saravana Velusamy, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 570 days.

(21) Appl. No.: 14/507,128

(22) Filed: Oct. 6, 2014

(51) Int. Cl.
*H04W 72/04* (2009.01)
*H04W 72/12* (2009.01)

(52) U.S. Cl.
CPC ............................... *H04W 72/1263* (2013.01)

(58) Field of Classification Search
CPC .................................................. H04W 72/1263
See application file for complete search history.

(56) References Cited

U.S. PATENT DOCUMENTS

| 6,721,569 | B1 | | 4/2004 | Hashem et al. | |
|---|---|---|---|---|---|
| 8,578,015 | B2 | * | 11/2013 | Billhartz | H04L 43/0852 370/254 |
| 2006/0280142 | A1 | * | 12/2006 | Damnjanovic | H04B 7/2615 370/329 |
| 2008/0013480 | A1 | * | 1/2008 | Kapoor | H04W 36/06 370/328 |
| 2008/0025255 | A1 | | 1/2008 | Garg et al. | |
| 2008/0254833 | A1 | * | 10/2008 | Keevill | H04L 12/5692 455/558 |
| 2008/0320354 | A1 | * | 12/2008 | Doppler | H04L 1/04 714/748 |
| 2009/0141677 | A1 | | 6/2009 | Maas | |
| 2010/0093281 | A1 | * | 4/2010 | Khanka | H04W 36/165 455/42 |
| 2011/0222505 | A1 | * | 9/2011 | Li | H04L 5/0007 370/330 |
| 2012/0044922 | A1 | * | 2/2012 | Ishii | H04L 5/001 370/338 |

(Continued)

OTHER PUBLICATIONS

U.S. Appl. No. 13/964,929, filed Aug. 12, 2013, entitled "Methods and Systems for Selecting Frequency Bands for a Radio Connection".

*Primary Examiner* — Noel R Beharry
*Assistant Examiner* — Pamit Kaur

(57) ABSTRACT

In a communication system comprising a base station having a set of carrier frequencies, ranging from a lowest to a highest carrier frequency, for serving user equipment devices (UEs), the base station may schedule a first transmission of first bearer traffic to be on a first carrier frequency of the set based at least in part on a correlation between (i) the first bearer traffic being of a first type of bearer traffic and (ii) where the first carrier frequency falls within the range of carrier frequencies. The base station may also schedule a second transmission of second bearer traffic to be on a second, different carrier frequency of the set based at least in part on a correlation between (i) the second bearer traffic being of a second, different type of bearer traffic and (ii) where the second carrier frequency falls within the range of carrier frequencies.

20 Claims, 3 Drawing Sheets

(56) References Cited

U.S. PATENT DOCUMENTS

| | | |
|---|---|---|
| 2012/0252477 A1 | 10/2012 | Rao |
| 2013/0010711 A1 | 1/2013 | Larsson et al. |
| 2013/0109372 A1* | 5/2013 | Ekici .................. H04W 24/02 455/422.1 |
| 2013/0176952 A1 | 7/2013 | Shin et al. |
| 2013/0176957 A1 | 7/2013 | Gao et al. |
| 2013/0190027 A1* | 7/2013 | Cao .................. H04W 52/0206 455/509 |
| 2014/0016594 A1 | 1/2014 | Han et al. |
| 2014/0023017 A1* | 1/2014 | Karls .................... H04W 72/04 370/329 |
| 2014/0066050 A1* | 3/2014 | Kotecha ............. H04W 72/048 455/422.1 |
| 2014/0119263 A1 | 5/2014 | Shauh et al. |
| 2014/0135027 A1* | 5/2014 | Kodali .............. H04W 72/1278 455/452.1 |
| 2014/0177607 A1 | 6/2014 | Li et al. |
| 2014/0233502 A1 | 8/2014 | Fong et al. |
| 2015/0092652 A1 | 4/2015 | Ramamurthy et al. |
| 2015/0180617 A1 | 6/2015 | Sun et al. |
| 2015/0195077 A1 | 7/2015 | Kim et al. |
| 2015/0208311 A1* | 7/2015 | Lee ...................... H04W 24/10 455/436 |
| 2015/0245376 A1 | 8/2015 | Bashar et al. |
| 2015/0264687 A1* | 9/2015 | Singh ................ H04W 72/0453 370/280 |
| 2015/0334702 A1 | 11/2015 | Ji et al. |
| 2015/0350094 A1 | 12/2015 | Izhak-Ratzin et al. |
| 2016/0057066 A1 | 2/2016 | Gasparakis et al. |
| 2016/0057684 A1* | 2/2016 | Larsson ................ H04W 36/26 370/331 |
| 2016/0192379 A1 | 6/2016 | Behravan et al. |
| 2016/0210241 A1 | 7/2016 | Jacobs et al. |

\* cited by examiner

METHOD AND SYSTEM FOR SELECTING A CARRIER ON WHICH TO SCHEDULE COMMUNICATIONS OF A TYPE OF BEARER TRAFFIC

BACKGROUND

Unless otherwise indicated herein, the description provided in this section is not itself prior art to the claims and is not admitted to be prior art by inclusion in this section.

In a wireless communication system, a base station may provide one or more coverage areas, such as cells or sectors, in which the base station may serve user equipment devices (UEs) (also known as wireless communication devices (WCDs)), such as cell phones, wirelessly-equipped personal computers or tablets, tracking devices, embedded wireless communication modules, or other devices equipped with wireless communication functionality. In general, each coverage area may operate on one or more carriers each defining a respective bandwidth of coverage, and each coverage area may define an air interface providing a downlink for carrying communications from the base station to UEs and an uplink for carrying communications from UEs to the base station. The downlink and uplink may operate on separate carriers or may be time division multiplexed over the same carrier(s). Further, the air interface may define various channels for carrying communications between the base station and UEs. For instance, the air interface may define one or more downlink traffic channels and downlink control channels, and one or more uplink traffic channels and uplink control channels.

In accordance with a recent version of the Long Term Evolution (LTE) standard of the Universal Mobile Telecommunications System (UMTS), for instance, the air interface on both the downlink and the uplink may span a particular frequency bandwidth (such as 1.4 MHz, 3 MHz, 5 MHz, 10 MHz, or 20 MHz) that is divided primarily into subcarriers spaced apart from each other by 15 kHz. Further, the air interface is divided over time into a continuum of 10-millisecond frames, with each frame being further divided into ten 1-millisecond subframes or transmission time intervals (TTIs) that are in turn each divided into two 0.5-millisecond segments. In each 0.5 millisecond segment or in each 1 millisecond TTI, the air interface is then considered to define a number of 12-subcarrier wide "resource blocks" spanning the frequency bandwidth (i.e., as many as would fit in the given frequency bandwidth). In addition, each resource block is divided over time into symbol segments of 67 μs each, with each symbol segment spanning the 12-subcarriers of the resource block and thus supporting transmission of symbols in "resource elements."

The LTE air interface then defines various channels made up of certain ones of these resource blocks and resource elements. For instance, on the downlink, certain resource elements across the bandwidth are reserved to define a physical downlink control channel (PDCCH) for carrying control signaling from the base station to UEs, and other resource elements are reserved to define a physical downlink shared channel (PDSCH) for carrying bearer data transmissions from the base station to UEs. Likewise, on the uplink, certain resource elements across the bandwidth are reserved to define a physical uplink control channel (PUCCH) for carrying control signaling from UEs to the base station, and other resource elements are reserved to define a physical uplink shared channel (PUSCH) for carrying bearer data transmissions from UEs to the base station.

In a system arranged as described above, when a UE enters into coverage of a base station, the UE may engage in attach signaling with the base station, by which the UE would register to be served by the base station on a particular carrier (perhaps a particular pair of downlink carrier and uplink carrier). Through the attach process and/or subsequently, the base station and supporting LTE network infrastructure may establish for the UE one or more bearers, essentially defining logical tunnels for carrying bearer data between the UE and a transport network such as the Internet.

Once attached with the base station, a UE may then operate in a "connected" mode in which the base station may schedule data communication to and from the UE on the UE's established bearer(s). In particular, when a UE has data to transmit to the base station, the UE may transmit a scheduling request to the base station, and the base station may responsively allocate one or more upcoming resource blocks on the PUSCH to carry that bearer traffic and transmit on the PDCCH to the UE a downlink control information (DCI) message that directs the UE to transmit the bearer traffic in the allocated resource blocks, and the UE may then do so. Likewise, when the base station has bearer traffic to transmit to the UE, the base station may allocate PDSCH resource blocks to carry that bearer traffic and may transmit on the PDCCH to the UE a DCI message that directs the UE to receive the bearer traffic in the allocated resource blocks, and the base station may thus transmit the bearer traffic in the allocated resource blocks to the UE. LTE also supports uplink control signaling on the PUCCH using uplink control information (UCI) messages. UCI messages can carry scheduling requests from UEs, requesting the base station to allocate PUSCH resource blocks for uplink bearer data communication.

In some systems, when a UE is attached with a base station on a particular carrier (e.g., pair of downlink carrier and uplink carrier), the base station provides DCIs to the UE on the PDCCH of that carrier and schedules downlink communication of bearer data to the UE on the PDSCH of that carrier. In other systems, however, a revision of LTE known as LTE-Advanced may permit a base station to serve a UE with "carrier aggregation," by which the base station schedules bearer communication with the UE on multiple carriers at a time.

When carriers are aggregated, each carrier may be referred to as a component carrier. Of the component carriers, one may be a primary carrier (or "PCell") and the others may be secondary carrier frequencies (or "SCells"). The primary carrier may be the carrier that the UE receives with the strongest signal (e.g., the carrier on which the UE is attached). However, other factors may be taken into account as well, or instead of, signal strength when assigning a primary carrier.

With carrier aggregation, a base station may provide a DCI message to a UE on the primary carrier, but may use that DCI message to schedule downlink communication of bearer data to the UE on two or more carriers at time, such as on both the PDSCH of the UE's primary carrier and the PDSCH of one or more secondary carriers. Such carrier aggregation can significantly increase the base station's effective bandwidth, well beyond the 20 MHz limit.

Overview

A service provider may find it desirable to have a base station serve one or more UEs with high quality bearer communication. In particular, a service provider may find it desirable to have the base station serve UEs with certain types of bearer communication (or "content types" as referred to herein) at a high quality, such as voice over Internet Protocol (VoIP) content (e.g., voice over LTE (VoLTE)) or other real-time content such as gaming content and video calling content, among other possibilities. In practice, network resources used for bearer communication, such as those discussed above, may have an impact on the quality of bearer service. For instance, bearer communication on lower carrier frequencies may facilitate higher channel quality and decreased packet loss during bearer communication by providing improved radio frequency propagation or the like, and may thereby likely increase bearer communication quality. Whereas, bearer communication on higher carrier frequencies may result in channel quality degradation and higher packet losses by providing reduced radio frequency propagation or the like, and may thereby likely decrease bearer communication quality. Thus, when a base station has a particular extent of resource blocks available across a given bandwidth of a carrier or across a range of carriers as described above, at issue is how the base station should allocate those resource blocks for the purpose of providing better bearer service to UEs.

In accordance with the disclosure, a base station may be configured to allocate lower or higher resource blocks based on a content type of bearer traffic, and may schedule a transmission of the bearer traffic between the base station and a UE served by the base station in the allocated resource blocks. For instance, the base station may have a plurality of carriers ranging from a lowest carrier to a highest carrier, and the base station may be configured to schedule transmission of first bearer traffic (e.g., VoLTE traffic) to be on a low carrier, such as the lowest carrier, based on the first bearer traffic being of a first content type. In addition, the base station may be configured to schedule transmission of second bearer traffic (e.g., web browsing traffic) to be on a higher carrier (e.g., a carrier other than the lowest few carriers), based on the second bearer traffic being of a second content type.

A base station may be configured to determine the content type at issue in various ways. By way of example, in a system arranged as described above, as well as in other systems, certain Internet Protocol (IP) addresses and/or port numbers may correspond with certain types of content. For instance, during establishment of a given bearer, a network entity might assign to a UE an IP address from a group of IP addresses specified for that type of content. Accordingly, a base station receiving an indication that the given bearer is going to be used for communication to or from such an IP address can suggest to the base station that the communication is of the content type that corresponds to the group of IP addresses. Thus, a base station may be arranged to allocate resources based on content type by allocating resources based on IP address(es) and/or port number(s) permitted for communications on a given bearer, regardless of whether the base station knows the actual content types that correspond to each of various IP addresses and/or port numbers. By way of example, in accordance with the disclosure, the base station may be arranged to allocate resources in a certain carrier range for communications on a given bearer that will be to or from one or more particular IP addresses and/or port numbers which may correspond to a particular content type. In addition, the base station may be arranged to allocate resources in another carrier range for communications on a given bearer that will be to or from one or more other particular IP addresses which may correspond to another particular content type.

In some scenarios, the base station may receive more expressly a designation of the content type. For instance, after a given bearer has been established for a UE served by the base station, the UE may transmit to the base station a message including a specification of the content type of the bearer traffic in which the UE will engage on the given bearer. Thus, a base station may be arranged to allocate resources based on a message specifying a content type. By way of example, in accordance with the disclosure, the base station may receive a message specifying a particular content type, and may be arranged to allocate resources in a certain carrier range for communications on a given bearer of the particular content type specified by the message. In addition, the base station may receive another message specifying another particular content type, and may be arranged to allocate resources in another carrier range for communications on a given bearer of the other particular content type specified by the other message.

Accordingly, in one respect, disclosed is a method that includes scheduling, by a base station arranged to serve UEs over an air interface, a transmission of bearer traffic between a UE and the base station on the air interface, where the base station operates on a set of carrier frequencies ranging from a lowest carrier frequency to a highest carrier frequency, and where the scheduling comprises the base station scheduling the transmission of the bearer traffic between the UE and the base station to be on a particular carrier frequency of the set based at least in part on both (i) the bearer traffic being a particular type of bearer traffic and (ii) where the particular carrier frequency falls within the range of carrier frequencies of the set.

In another respect, disclosed is a method operable in a communication system comprising a base station arranged to provide service on an air interface and configured to operate on a set of carrier frequencies ranging from a lowest carrier frequency to a highest carrier frequency. In accordance with the disclosure, the method includes the base station scheduling a first transmission of first bearer traffic on the air interface, where the scheduling of the first transmission comprises the base station scheduling the first transmission to be on a first carrier frequency of the set based at least in part on a correlation between (i) the first bearer traffic being of a first type of bearer traffic and (ii) where the first carrier frequency falls within the range of carrier frequencies of the set. Further, the method includes the base station scheduling a second transmission of second bearer traffic on the air interface, where the scheduling of the second transmission comprises the base station scheduling the second transmission to be on a second, different carrier frequency of the set based at least in part on a correlation between (i) the second bearer traffic being of a second, different type of bearer traffic and (ii) where the second carrier frequency falls within the range of carrier frequencies of the set.

In yet another respect, disclosed is a base station that includes an antenna structure that radiates to define a coverage area for providing service on an air interface, where the coverage area operates on a set of carrier frequencies ranging from a lowest carrier frequency to a highest carrier frequency. Further, the base station includes a controller comprising at least one processing unit, data storage, and program instructions stored in the data storage and executable by the at least one processing unit to carry out operations, where the data storage includes data that correlates respective ranges of carrier frequencies of the set to respective content types of bearer traffic. The operations may include scheduling a first transmission of first bearer traffic on the air interface, where the scheduling of the first transmission comprises scheduling the first transmission to be on a first carrier frequency of the set based at least in part on (i) the first bearer traffic being of a first content type and (ii) the data correlating a range of carrier frequencies, including the first carrier frequency, to the first content type of bearer traffic. Further, the operations may include scheduling a second transmission of second bearer traffic on the air interface, where the scheduling of the second transmission comprises scheduling the second transmission to be on a second, different carrier frequency of the set based at least in part on (i) the second bearer traffic being of a second, different content type and (ii) the data correlating a different range of carrier frequencies, including the second carrier frequency, to the second content type of bearer traffic.

This overview is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

The present methods will be described herein primarily in the context of LTE. However, it will be understood that principles of the disclosure can extend to apply in other scenarios as well, such as with respect to other air interface protocols, such as Code Division Multiple Access (CDMA) (e.g., 1×RTT and 1×EV-DO) or Global System for Mobile Communications (GSM), among other possibilities. Further, even within the context of LTE, numerous variations from the details disclosed herein may be possible. For instance, elements, arrangements, and operations may be added, removed, combined, distributed, or otherwise modified. In addition, it will be understood that functions described here as being performed by one or more entities may be implemented in various ways, such as by a processor executing software instructions for instance.

Figure 1:
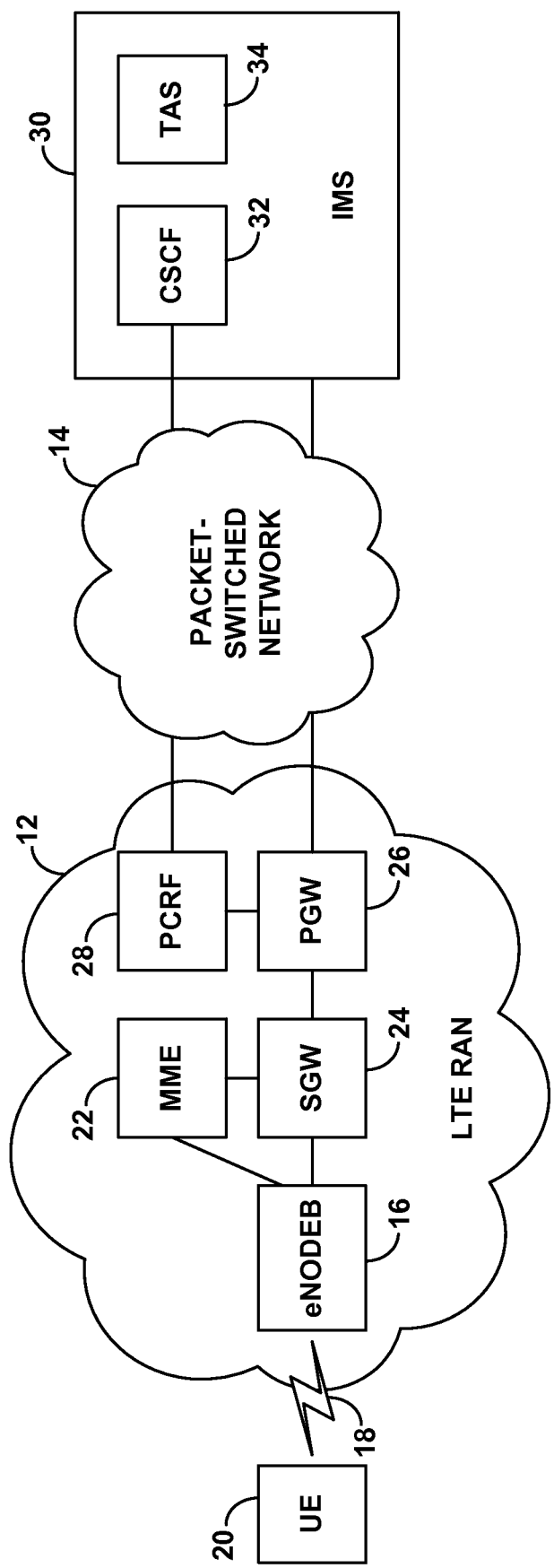
FIG. 1 is a simplified block diagram of an example communication system in which aspects of the present disclosure can be implemented.

Referring to the drawings, as noted above, FIG. 1 is a simplified block diagram of an example network arrangement in which features of the present disclosure can be implemented. In particular, the figure depicts an example radio access network (RAN) 12 as an LTE network that is arranged to serve UEs over an LTE air interface protocol and to provide connectivity with a packet-switched network 14. It should be understood, however, that the example RAN could take other forms as well, using other air interface protocols.

As shown, the example LTE network 12 includes an eNodeB (base station) 16 that radiates to provide an air interface 18 through which to serve UEs, such as a representative UE 20 (e.g., a cell phone, a wirelessly-equipped computer, a tracking device, an embedded wireless communication module, or any other type of wireless communication device). Further, the LTE network includes a mobility management entity (MME) 22 that has a communication interface with the eNodeB 16, and a serving gateway (SGW) 24 that has communication interfaces with the eNodeB and the SGW. And still further, the LTE network includes a packet data network gateway (PGW) 26 that has a communication interface with the SGW and that provides connectivity with the packet-switched network 14, and a policy and charging rules function (PCRF) 28 that has a communication interface with the PGW.

As further shown, the example arrangement includes an Internet Multimedia Subsystem (IMS) platform 30 accessible via the packet-switched network 14, which functions to support VoIP call connections such as VoLTE calls and other such packet-based real-time media sessions. As shown, the IMS platform includes a Call Session Control Function (CSCF) 32 and a Telephony Application Server (TAS) 34. Further, the CSCF 32 has a communication interface (e.g., via the packet-switched network) with the PCRF 28 of the LTE network 12, to facilitate working with the LTE network to set up VoLTE calls and other sessions for served UEs.

As discussed above, in accordance with LTE, when the UE 20 enters into coverage of the eNodeB 16, the UE and LTE network 12 may engage in an initial attach process. Through the initial attach process and/or subsequently, the LTE network may establish for the UE one or more bearers extending between the UE and the PGW 26, for carrying data communications between the UE and the packet-switched network 14. This establishment of bearers may be initiated by the UE or may be initiated by the LTE network. An initial setup of one or more bearers for the UE 20 may involve establishing for each bearer a respective virtual tunnel that includes a radio-link tunnel extending between the UE and the eNodeB 16 and a backhaul tunnel extending between the eNodeB and the PGW via the SGW 24. Further, the process may involve establishing for the UE a logical "Radio Resource Configuration" (RRC) connection encompassing the one or more radio-link portions. At a later point in time, in some scenarios, the UE may transition from an RRC "connected" mode to an RRC "idle" mode in which the UE does not have a radio-link layer connection. However, in such scenarios, the UE can trigger reassignment of an RRC connection and thereby transition back into the RRC connected mode.

Bearers can be classified into two types based on the nature of the quality of service (QoS) they provide: minimum guaranteed-bit-rate (GBR) bearers and non-GBR bearers. For each such bearer, network resources (such as bandwidth, resource blocks, timeslots, and transmission power, among other examples) may be allocated at the time the bearer is established. Further, each bearer may have a particular class of service defined by a QoS class identifier (QCI) level, for carrying a particular class or type of data. QCI levels may be designated by QCI numbers ranging from 1 to 9, for instance, with QCI levels 1 through 4 being for GBR bearer communications of various types and QCI levels 5 through 9 being for non-GBR bearer communications of various types.

In typical practice, the LTE network 12 may establish for the UE 20 at least a non-GBR default Internet bearer for carrying general "best efforts" data traffic (such web browsing traffic, File Transfer Protocol (FTP) traffic, and messaging traffic) between the UE and various remote network entities. Further, if the UE subscribes to VoIP service such as VoLTE service, the LTE network may establish for the UE a non-GBR, IMS signaling bearer (e.g., QCI level 5) for carrying VoLTE call setup signaling such as Session Initiation Protocol (SIP) signaling between the UE and the IMS platform. In turn, after the initial attach process, the LTE network may then establish for the UE a GBR dedicated bearer such as an IMS dedicated bearer for carrying VoLTE traffic (e.g., QCI level 1) (namely, data traffic representing speech) between the UE and the network.

In practice, a content type of bearer traffic (e.g., VoLTE content, gaming content, web browsing content, and the like) to be communicated on a particular established bearer can be designated at the time of establishment of the particular bearer and/or can be designated after establishment of the particular bearer. Further, such a content type of bearer traffic may be designated at various levels of granularity. For instance, the content type of bearer traffic may be designated by a particular QCI level, with which multiple content types of bearer traffic can be communicated. Alternatively, a specific content type of bearer traffic may be designated, where the specific content type of bearer traffic can be communicated with the particular QCI level.

As an example of content type designation, in some UE-initiated bearer establishment scenarios, when the UE transmits an initial attach request to the eNodeB 16 to establish a particular bearer, the UE may specify in the attach request a QCI level for the particular bearer. In response to the eNodeB receiving the attach request, the LTE network may establish the particular bearer, which can then be used for carrying bearer traffic supported by the particular bearer. For instance, the UE may specify in the attach request a QCI level 5, and the LTE network may responsively establish an IMS signaling bearer, which can then be used for carrying VoLTE call setup signaling. During or after establishment, of the particular bearer, the MME 22 or another entity of the LTE network may assign a bearer ID for the particular bearer. The eNodeB may then store, in a context record for the particular bearer (keyed to the particular bearer's bearer ID), a specification of the QCI level of the particular bearer.

As another example, at the time of bearer establishment, bearer setup signaling that passes from the PGW 26 to the eNodeB 16 through the MME 22 may include a bearer ID (e.g., a three bit value) and may also include a traffic flow template (TFT) that specifies source and/or destination IP addresses and port numbers that are allowed for packet data communication on the bearer that is being established. For instance, during set up of a dedicated QCI level 1 bearer for carrying VoLTE traffic, the TFT may specify an IP address that the PGW has assigned to the UE for engaging in VoLTE communication and may further specify an IP address of the IMS platform 30 with which the UE will engage in VoLTE communication. Accordingly, the eNodeB may restrict communication on the dedicated QCI level 1 bearer to be just to and/or from those specified IP addresses. The eNodeB may then store, in a context record for the dedicated QCI level 1 bearer (keyed to its bearer ID), a specification of the IP addresses permitted for the dedicated QCI level 1 bearer. Other TFTs are possible as well, where the other TFTs may specify one or more other IP addresses and/or port numbers that correspond to other types of bearer traffic.

As still another example, once one or more bearers are established for the UE 20, the eNodeB 16 and the UE may engage in further signaling that may indicate to the eNodeB a content type of bearer traffic that may be communicated on the established bearer(s). For instance, at some point while the eNodeB is serving the UE on a particular established bearer that can support one or more different content types of bearer traffic, the LTE network 12 and the UE can engage in RRC signaling to reconfigure one or more radio-link portions of the particular bearer. By way of example, the UE may transmit to the eNodeB an "RRC Connection Reconfiguration" message for the particular bearer that specifies a bearer ID for the particular bearer and indicates a particular content type of bearer traffic supported by the particular bearer. The eNodeB may then store the indicated particular content type in a context record for the particular bearer (keyed to its bearer ID).

In an LTE system arranged as discussed above, the eNodeB 16 may have a particular extent of resource blocks available across a given frequency bandwidth, which the eNodeB can schedule to be transmitted to and from the UE 20 on a particular one or more carriers (contiguous or non-contiguous) used for serving the UE. For instance, when a UE has bearer traffic of a given content type to transmit to the eNodeB, the UE may transmit a scheduling request (e.g., included in a UCI message) to the eNodeB, and the eNodeB may responsively allocate one or more upcoming resource blocks on the PUSCH to carry that bearer traffic and transmit on the PDCCH to the UE a DCI message that directs the UE to transmit the bearer traffic in the allocated resource blocks, and the UE may then do so. Likewise, when the eNodeB has data to transmit to the UE, the eNodeB may allocate PDSCH resource blocks to carry that bearer traffic and may transmit on the PDCCH to the UE a DCI message that directs the UE to receive the bearer traffic in the allocated resource blocks, and the eNodeB may thus transmit the bearer traffic in the allocated resource blocks to the UE.

In accordance with the present disclosure, an eNodeB in a system such as this may be configured to allocate resource blocks at various positions in a given bandwidth of a carrier or in a given range of carriers in a manner that may improve bearer service to UEs served by the eNodeB. In particular, an eNodeB (e.g., eNodeB 16) having a set of carriers ranging from a lowest carrier to a highest carrier may be configured to allocate resource blocks in a low, medium, or high carrier range based on the designated content type of bearer traffic as discussed above. The eNodeB can thus schedule a transmission of the bearer traffic of the designated content type between the eNodeB and a UE served by the eNodeB in the allocated resource blocks.

In particular, when the UE 20 requests an uplink transmission of bearer traffic on a particular bearer, or when the eNodeB 16 has bearer traffic to transmit to the UE on the particular bearer, the eNodeB may be configured to refer to a context record for the particular bearer (keyed to the particular bearer's bearer ID). The eNodeB can then determine from data stored in the context record a designation of a particular content type that is to be transmitted on the particular bearer. Based on that data, the eNodeB may be configured to select a low, medium, or high carrier of the set on which to schedule the transmission of the particular content type of bearer traffic. For instance, for IP addresses designating content type as noted above, the eNodeB may know that transmissions to and from certain IP addresses should be scheduled on low carriers, while transmissions to and from other IP addresses should be scheduled on medium or high carriers.

In an example of this process, the eNodeB 16 may be configured to select a low carrier of the set on which to schedule a transmission of bearer traffic on a dedicated QCI level 1 bearer based on the bearer traffic being VoLTE traffic. The eNodeB may determine that the bearer traffic is VoLTE traffic by referring to a context record for the dedicated QCI level 1 bearer, which may include data designating VoLTE content as the content type of the bearer traffic at issue. In some scenarios, the eNodeB may be configured to schedule the transmission of VoLTE traffic to be on the lowest carrier of the set. As noted above, the eNodeB selecting a lower (or lowest) carrier on which to schedule the transmission may likely increase VoLTE communication quality due to improved radio frequency propagation on lower carriers, as discussed above.

Likewise, the eNodeB may be configured to select a medium or high carrier of the set on which to schedule a transmission of different bearer traffic (e.g., FTP traffic) on a different bearer (e.g., a non-GBR, QCI level 6 bearer) based on the different bearer traffic being of a different content type. The eNodeB may determine that the different bearer traffic is of a different content type be referring to a context record for the different bearer, which may include data designating the different content type. The eNodeB may select a medium or high carrier for certain content types (e.g., FTP) for which improved radio frequency propagation may be less desirable than for other types of bearer traffic (e.g., VoLTE), for instance. Other examples of this process are possible as well.

In line with the discussion above, the UE 20 or other network entities may, through various forms of signaling, designate to the eNodeB 16 a content type of bearer traffic to be communicated on a particular established bearer, which the eNodeB can then use as a basis for selecting one or more carriers on which to schedule a transmission of the content type of bearer traffic. For example, during a UE-initiated bearer establishment, the eNodeB may receive from the UE an attach request specifying a QCI level, and the eNodeB may responsively establish a particular bearer with that QCI level. The eNodeB may also create and store in memory a context record for the particular bearer (keyed to a bearer ID assigned to the particular bearer during bearer establishment), and may store in the context record data including the QCI level specified by the attach request.

As further noted above, a network entity such as the PGW 26 may assign to a UE an IP address from a group of IP addresses specified for a particular content type, and an eNodeB receiving an indication that a particular bearer is going to be used for bearer traffic to or from the assigned IP address can suggest to the eNodeB that the bearer traffic is of the particular content type that corresponds to the group of IP addresses. Thus, as another example of content type designation, the eNodeB 16 may receive, from another entity of the LTE network 12, a TFT that specifies a bearer ID for a particular bearer and further specifies one or more IP addresses permitted for transmission of bearer traffic on a particular bearer, where the specified IP addresses correspond to a content type. Accordingly, the eNodeB may restrict communication on the particular bearer to be just to and/or from the specified IP addresses, and may store, in a context record for the particular bearer (keyed to its bearer ID), a specification of the IP addresses permitted for the particular bearer.

As still another example of content type designation, the eNodeB 16 may receive, from the UE 20, an RRC Connection Reconfiguration message (or other RRC signaling) for a particular bearer that expressly specifies a content type supported by the particular bearer. The eNodeB may then store data indicating the content type in a context record for the particular bearer (keyed to its bearer ID). As noted above, communication of the specified content type to and/or from the UE would presumably be limited to IP addresses and/or port numbers specified by a TFT for the particular bearer.

It should be understood that content type may be designated to or otherwise learned by the eNodeB 16 in other manners. For example, a network entity in the data communication path (e.g., the eNodeB, MME 22, SGW 24, or PGW 26) may perform deep packet inspection to learn the content type. Namely, that network entity may read the payload of one or more packets transmitted between the UE 20 and the packet-switched network 14 over a particular bearer and programmatically determine that the payload indicates the content type of bearer traffic. In scenarios where that network entity is not the eNodeB, for instance, that network entity may then inform the eNodeB that the payload indicates the content type of bearer traffic. Other examples are possible as well.

The disclosed process can be performed in various systems, such as a carrier aggregation system. In line with the discussion above, each eNodeB in an LTE network may operate on just one carrier, defining one cell. However, the eNodeB may provide multiple such cells and may have the ability to use the carrier of one cell together with carrier of another cell so as to serve a UE with carrier aggregation under LTE-Advanced. Namely, the eNodeB may serve the UE on multiple component carriers (contiguous or non-contiguous) at a time, including a primary component carrier on which the UE is attached and at least one secondary component carrier. Thus, with a carrier aggregation arrangement, the eNodeB may be configured to select at least one component carrier of the multiple component carriers on which to schedule a transmission of bearer traffic of a given content type.

By way of example, while an eNodeB serves a UE with carrier aggregation on a primary component carrier and a secondary component carrier, the eNodeB may be configured to use resource blocks of only one of those two component carriers for bearer transmissions of a given content type (e.g., VoLTE), but for bearer transmissions of a different content type (e.g., e-mail), the eNodeB may be configured to use resource blocks of the other component carrier or use resource blocks across both of the component carriers (i.e., distribute traffic of the different content type among the two carriers). As another example, when the eNodeB is configured to distribute traffic of a content type among two or more of the UE's component carriers, the eNodeB may be configured to (i) schedule a portion of a transmission of the content type of bearer traffic to be on the UE's primary component carrier and (ii) schedule other portions of the transmission to be on at least one of the UE's secondary component carriers. The eNodeB may then direct the UE to concurrently receive or transmit the portion of the transmission on the primary component carrier and receive or transmit the other portion(s) of the transmission on the secondary component carrier(s). Other examples are possible as well.

Figure 2:
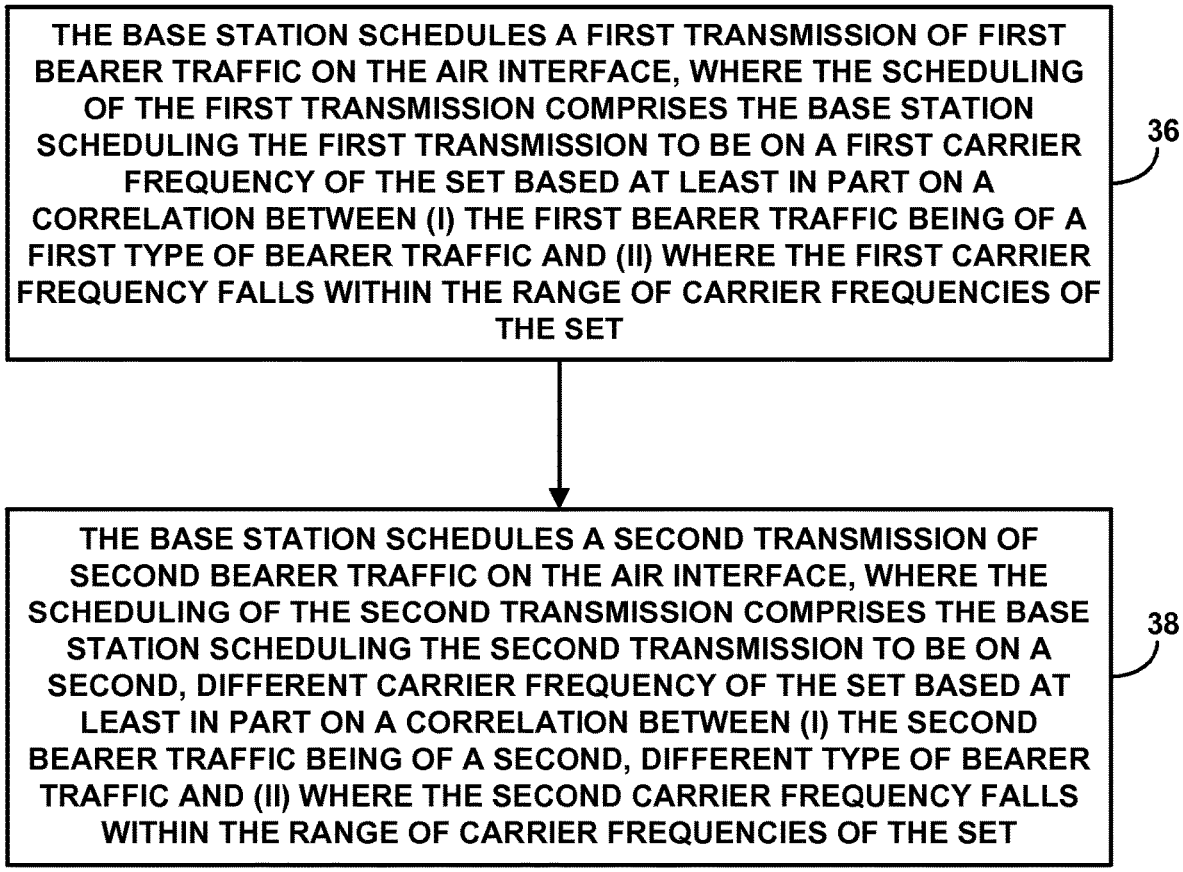
FIG. 2 is a flow chart depicting operations that can be carried out in accordance with the present methods.

FIG. 2 is a flow chart depicting operations that can be carried out in accordance with this description. Namely, the operations may be carried out by a base station, such as an eNodeB, that is arranged to provide service on an air interface and configured to operate on a set of carrier frequencies ranging from a lowest carrier frequency to a highest carrier frequency. As shown in FIG. 2, at block 36, the base station schedules a first transmission of first bearer traffic on the air interface, where the scheduling of the first transmission comprises the base station scheduling the first transmission to be on a first carrier frequency of the set based at least in part on a correlation between (i) the first bearer traffic being of a first type of bearer traffic and (ii) where the first carrier frequency falls within the range of carrier frequencies of the set. At block 38, the base station schedules a second transmission of second bearer traffic on the air interface, where the scheduling of the second transmission comprises the base station scheduling the second transmission to be on a second, different carrier frequency of the set based at least in part on a correlation between (i) the second bearer traffic being of a second, different type of bearer traffic and (ii) where the second carrier frequency falls within the range of carrier frequencies of the set.

In this method, the first transmission may be between the base station and a UE served by the base station, and the second transmission may be between the base station and another, different UE served by the base station. Alternatively, both the first transmission and the second transmission may be between the base station and the same UE. Further, the base station may be configured to schedule the first and second transmissions to each be on one carrier. In a carrier aggregation system, however, the base station may be configured to schedule the first and second transmissions to each be on multiple component carriers, either contiguous or non-contiguous.

As discussed above, before scheduling the first and second transmissions, the base station may receive first and second indicators of the first and second types of bearer traffic, respectively. Accordingly, the base station may be configured to schedule the first transmission to be on the first carrier frequency of the set based at least in part on a correlation between (i) the first type of bearer traffic designated by the first indicator and (ii) where the first carrier frequency falls within the range of carrier frequencies of the set. The base station may also be configured to schedule the second transmission to be on the second, different carrier frequency of the set based at least in part on a correlation between (i) the second type of bearer traffic designated by the second indicator and (ii) where the second carrier frequency falls within the range of carrier frequencies of the set.

Furthermore, the indicator that designates to the base station the type of bearer traffic to be communicated may take various forms, and may designate the type of bearer traffic at various levels of granularity. For example, the indicator may be an attach request, received from a UE, which specifies a QCI level for a particular bearer on which the type of bearer traffic at issue will be communicated. As another example, the indicator may be a TFT, received from a network entity, which specifies one or more IP addresses permitted for communication of the type of bearer traffic at issue. As still another example, the indicator may be an RRC signaling message, received from a UE, which expressly specifies the type of bearer traffic at issue. Other examples are also possible.

Moreover, as discussed above, the base station may maintain data that correlates respective ranges of carriers of the set to respective content types of bearer traffic. Such data may correlate respective ranges of carriers to a specific content type, or may correlate respective ranges of carriers to a less-expressly-designated content type (e.g., respective ranges of carriers correlated to IP addresses permitted for communication of multiple content types of bearer traffic). The base station can thus schedule the first transmission to be on the first carrier frequency of the set based at least in part on (i) the first bearer traffic being of the first content type and (ii) the data correlating a range of carrier frequencies, including the first carrier frequency, to the first content type of bearer traffic. Likewise, the base station can schedule the second transmission to be on the second, different carrier frequency of the set based at least in part on (i) the second bearer traffic being of the second, different content type and (ii) the data correlating a different range of carrier frequencies, including the second carrier frequency, to the second content type of bearer traffic.

As also discussed above, the base station may be configured to schedule transmissions of certain content types of bearer traffic to be on lower carrier frequencies of the set, such as the lowest carrier frequency of the set, or possibly on the second- or third-lowest carrier frequency of the set when the lowest carrier frequency of the set is not available for use. For instance, the base station may be configured to schedule VoIP traffic such as VoLTE traffic to be on the lowest carrier frequency of the set for at least the reason that it may be desirable to communicate VoIP traffic more reliably with improved propagation, less channel degradation, and less packet loss. In addition, the base station may be configured to schedule other types of bearer traffic to be on medium or higher carrier frequencies, based on the other types of bearer traffic being types of bearer traffic for which improved propagation and channel quality may be less desirable than for other types of bearer traffic (e.g., VoLTE), for instance. It should be understood, however, that the base station may be configured to schedule certain types of bearer traffic on certain carrier frequencies for other reasons in addition to or alternative to the reasons described herein.

Figure 3:
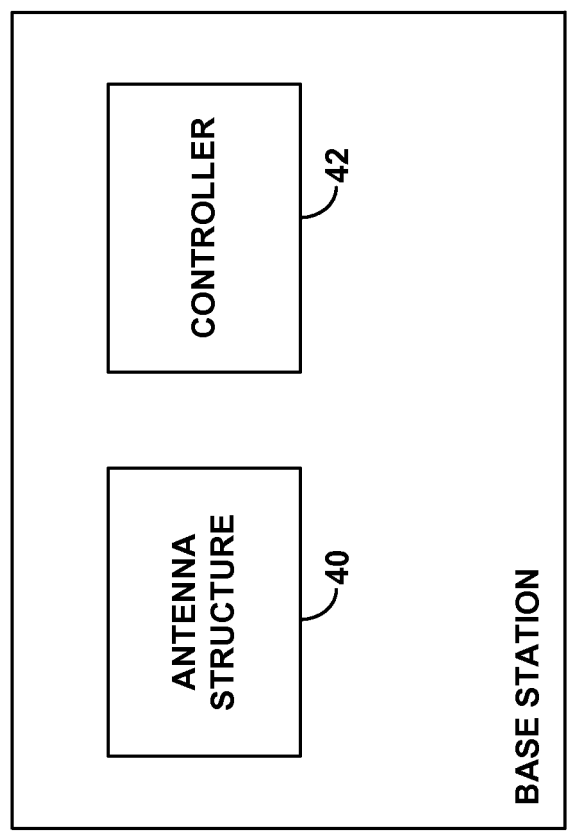
FIG. 3 is a simplified block diagram of an example base station arranged to implement aspects of the present methods.

FIG. 3 is a simplified block diagram of an example base station such as eNodeB 16, showing some of the components of such a base station that could be provided to facilitate implementation of functions such as those described above. As shown in FIG. 3, the example base station includes an antenna structure 40 that radiates to define an air interface coverage area for serving UEs, where the coverage area operates on a set of carriers ranging from a lowest carrier to a highest carrier. Further, the example base station includes a controller 42 that manages wireless communication via the antenna structure.

In practice, for instance, the controller 42 may include at least one processing unit, data storage, and program instructions stored in the data storage and executable by the at least one processing unit to carry out various operations described herein. Further, in line with the discussion above, the data storage may include data that correlates respective ranges of carriers of the set to respective designated content types of bearer traffic. For example, the data storage may include a context record for a bearer, keyed to the bearer ID of that bearer, where the context record includes a specification of one or more IP addresses permitted for the bearer, or may more particularly include a specification of one or more IP addresses permitted for communication of a specific content type of bearer traffic on the bearer.

While various aspects have been disclosed herein, other aspects will be apparent to those skilled in the art. The various aspects disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method performed by a base station that is arranged to serve user equipment devices (UEs) over an air interface, the method comprising:

operating, by the base station, on carriers ranging in frequency from a carrier lowest in frequency to a carrier highest in frequency;

during the operating, selecting, by the base station, from the range of carriers, a particular carrier on which to schedule a transmission of bearer traffic between a UE and the base station, wherein selecting the particular carrier comprises the base station (i) determining that the bearer traffic is a particular type of bearer traffic and, (ii) based on the bearer traffic having been determined to be the particular type of bearer traffic, selecting, from the range of carriers, the particular carrier based on the particular carrier being the carrier lowest in frequency in the range of carriers; and scheduling, by the base station, the transmission to be on the selected particular carrier.

2. The method of claim 1, wherein the base station determining that the bearer traffic is the particular type of bearer traffic comprises the base station receiving an indicator designating the particular type of the bearer traffic.

3. The method of claim 2, wherein the indicator comprises a traffic flow template (TFT) specifying one or more of: (i) at least one source Internet Protocol (IP) address and corresponding port number allowed for communication of the bearer traffic of the particular type and (ii) at least one destination IP address and corresponding port number allowed for communication of the bearer traffic of the particular type.

4. The method of claim 2, wherein the indicator comprises a Radio Resource Control (RRC) Connection Reconfiguration message, received from the UE, specifying the particular type of bearer traffic.

5. The method of claim 2, wherein the indicator comprises a quality of service (QoS) class identifier (QCI) for carrying bearer traffic of the particular type.

6. The method of claim 1, wherein the particular type of bearer traffic is Voice over Internet Protocol (VoIP) bearer traffic, and
wherein selecting the particular carrier comprises the base station (i) determining that the bearer traffic is VoIP bearer traffic and, (ii) based on the bearer traffic having been determined to be VoIP bearer traffic, selecting, from the range of carriers, the particular carrier based on the particular carrier being the carrier lowest in frequency in the range of carriers.

7. The method of claim 6, wherein the air interface is a Long Term Evolution (LTE) air interface and the VoIP bearer traffic is VoLTE bearer traffic.

8. The method of claim 1, further comprising:
the base station transmitting to the UE one of: a message directing the UE to receive the transmission on the particular carrier or a message directing the UE to make the transmission on the particular carrier.

9. The method of claim 1, wherein scheduling the transmission to be on the selected particular carrier comprises scheduling a portion of the transmission to be on the selected particular carrier, the method further comprising:
scheduling another portion of the transmission to be on another, different carrier of the range of carriers, wherein communication of the other portion of the transmission is to occur concurrently with communication of the portion of the transmission.

10. The method of claim 1, wherein the UE is a first UE, the method further comprising:
selecting, by the base station, from the range of carriers, a second carrier, different from the particular carrier, on which to schedule a second transmission of second bearer traffic between the base station and a second UE served by the base station, wherein selecting the second carrier comprises the base station (i) determining that the second bearer traffic is a second type of bearer traffic and, (ii) based on the second bearer traffic having been determined to be the second type of bearer traffic, selecting, from the range of carriers, the second carrier based on where in frequency the second carrier is located with respect to one or more carriers of the range of carriers other than the second carrier; and scheduling, by the base station, the second transmission to be on the selected second carrier.

11. The method of claim 10, wherein the second type of bearer traffic is web browsing bearer traffic, and
wherein selecting the second carrier comprises the base station (i) determining that the second bearer traffic is web browsing bearer traffic and, (ii) based on the second bearer traffic having been determined to be web browsing bearer traffic, selecting, from the range of carriers, the second carrier based on where in frequency the second carrier is located with respect to one or more carriers of the range of carriers other than the second carrier.

12. A base station comprising:
an antenna structure through which the base station engages in air interface communication with user equipment devices (UEs), wherein the base station is configured to operate on carriers ranging in frequency from a carrier lowest in frequency to a carrier highest in frequency; and
a controller comprising at least one processing unit, data storage, and program instructions stored in the data storage and executable by the at least one processing unit to carry out operations comprising:
selecting, from the range of carriers, a particular carrier on which to schedule a transmission of bearer traffic between a UE and the base station, wherein selecting the particular carrier comprises (i) determining that the bearer traffic is a particular type of bearer traffic and, (ii) based on the bearer traffic having been determined to be the particular type of bearer traffic, selecting, from the range of carriers, the particular carrier based on the particular carrier being the carrier lowest in frequency in the range of carriers; and
scheduling the transmission to be on the selected particular carrier.

13. The base station of claim 12, wherein the particular type of bearer traffic is Voice over Internet Protocol (VoIP) bearer traffic, and
wherein selecting the particular carrier comprises (i) determining that the bearer traffic is VoIP bearer traffic and, (ii) based on the bearer traffic having been determined to be VoIP bearer traffic, selecting, from the range of carriers, the particular carrier based on the particular carrier being the carrier lowest in frequency in the range of carriers.

14. The base station of claim 13, wherein the air interface is a Long Term Evolution (LTE) air interface and the VoIP bearer traffic is VoLTE bearer traffic.

15. The base station of claim 12, the operations further comprising:
transmitting to the UE one of: a message directing the UE to receive the transmission on the particular carrier or a message directing the UE to make the transmission on the particular carrier.

16. The base station of claim 12, the operations further comprising:
selecting, from the range of carriers, a second carrier, different from the particular carrier, on which to schedule a second transmission of second bearer traffic between the base station and another, different UE served by the base station, wherein selecting the second carrier comprises (i) determining that the second bearer traffic is a second type of bearer traffic, different from the particular type of bearer traffic and, (ii) based on the second bearer traffic having been determined to be the second type of bearer traffic, different from the particular type of bearer traffic, selecting, from the range of carriers, the second carrier based where in frequency the second carrier is located with respect to one or more carriers of the range of carriers other than the second carrier; and scheduling the second transmission to be on the selected second carrier.

17. The base station of claim 16, wherein the second type of bearer traffic is web browsing bearer traffic, and wherein selecting the second carrier comprises (i) determining that the second bearer traffic is web browsing bearer traffic and, (ii) based on the second bearer traffic having been determined to be web browsing bearer traffic, selecting, from the range of carriers, the second carrier based on where in frequency the second carrier is located with respect to one or more carriers of the range of carriers other than the second carrier.

18. A method in a communication system comprising a base station, wherein the base station is arranged to provide service on an air interface and configured to operate on carriers ranging in frequency from a carrier lowest in frequency to a carrier highest in frequency, the method comprising:

selecting, by the base station, from the range of carriers, a first carrier on which to schedule a first transmission of first bearer traffic on the air interface, wherein the base station selects the first carrier based on a correlation between (i) the first bearer traffic being of a first content type and (ii) the first carrier being the carrier lowest in frequency in the range of carriers;

selecting, by the base station, from the range of carriers, a second carrier on which to schedule a second transmission of second bearer traffic on the air interface, wherein the base station selects the second carrier based on a correlation between (i) the second bearer traffic being of a second content type, different from the first content type and (ii) where in frequency the second carrier is located with respect to one or more carriers of the range of carriers other than the second carrier;

scheduling, by the base station, the first transmission to be on the selected first carrier; and scheduling, by the base station, the second transmission to be on the selected second carrier.

19. The method of claim 18, wherein the first transmission is between the base station and one user equipment device (UE) served by the base station, and wherein the second transmission is between the base station and another, different UE served by the base station.

20. The method of claim 18, wherein the first transmission is between the base station and a user equipment device (UE) served by the base station, and wherein the second transmission is between the base station and the same UE.

* * * * *